United States Patent
Gustafson et al.

(10) Patent No.: US 12,448,079 B2
(45) Date of Patent: Oct. 21, 2025

(54) SINGLE-TRACK VEHICLE

(71) Applicant: KTM AG, Mattighofen (AT)

(72) Inventors: Torbjoern Gustafson, Berndorf bei Salzburg (AT); Hannes Fellner, Zipf (AT)

(73) Assignee: KTM AG, Mattighofen (AT)

( * ) Notice: Subject to any disclaimer, the term of this patent is extended or adjusted under 35 U.S.C. 154(b) by 0 days.

(21) Appl. No.: 18/509,961

(22) Filed: Nov. 15, 2023

(65) Prior Publication Data

US 2024/0166295 A1 May 23, 2024

Related U.S. Application Data

(63) Continuation of application No. PCT/AT2022/060130, filed on Apr. 26, 2022.

(30) Foreign Application Priority Data

May 17, 2021 (AT) .............................. A 50380/2021

(51) Int. Cl.
*B62K 25/12* (2006.01)
*B62K 25/28* (2006.01)

(52) U.S. Cl.
CPC ............ *B62K 25/12* (2013.01); *B62K 25/283* (2013.01); *B62K 2201/06* (2013.01)

(58) Field of Classification Search
CPC .. B62K 2201/06; B62K 25/12; B62K 25/283; B62K 25/286; B62K 25/28; F16F 1/18
See application file for complete search history.

(56) References Cited

U.S. PATENT DOCUMENTS

| | | |
|---|---|---|
| 1,168,702 A | 1/1916 | Babis, Jr. |
| 1,261,440 A | 4/1918 | Rigby |
| | (Continued) | |

FOREIGN PATENT DOCUMENTS

| | | |
|---|---|---|
| DE | 325453 | 9/1920 |
| DE | 450765 | 10/1927 |
| | (Continued) | |

OTHER PUBLICATIONS

Atsushi, JP H09109972 A1, Machine Translation of Specification (Year: 1997).*

(Continued)

*Primary Examiner* — Paul N Dickson
*Assistant Examiner* — Matthew Joseph Ganci
(74) *Attorney, Agent, or Firm* — Wenderoth, Lind & Ponack, L.L.P.

(57) ABSTRACT

A single-track vehicle, in particular a motorcycle, includes a frame, a rocker rotatable relative to the frame, and a leaf spring connected to the frame and to the rocker to achieve a spring effect between the rocker and the frame. The leaf spring is connected to the frame via a first lever and a first rotary bearing such that a first rotational axis of the first rotary bearing is transversely offset relative to the leaf spring as a result of the first lever. Alternatively or in addition, the leaf spring is connected to the rocker via a second lever and a second rotary bearing such that a second rotational axis of the second rotary bearing is transversely offset relative to the leaf spring as a result of the second lever.

17 Claims, 10 Drawing Sheets

(56) References Cited

U.S. PATENT DOCUMENTS

| | | | |
|---|---|---|---|
| 1,283,030 A * | 10/1918 | Ashton | B62K 25/286 |
| | | | D12/110 |
| 4,529,056 A | 7/1985 | Kreuz | |
| 4,972,920 A | 11/1990 | Zamitter et al. | |
| 5,279,383 A | 1/1994 | Gustafsson | |
| 5,785,339 A | 7/1998 | Mamiya et al. | |
| 5,816,356 A | 10/1998 | Jansson et al. | |
| 2003/0132603 A1 | 7/2003 | Girard | |

FOREIGN PATENT DOCUMENTS

| | | | |
|---|---|---|---|
| DE | 102012101551 A1 * | 8/2013 | B62K 25/08 |
| DE | 10 2012 101 551 B4 | 11/2016 | |
| EP | 0 394 438 | 10/1990 | |
| EP | 394438 A1 * | 10/1990 | |
| EP | 0725004 A1 * | 8/1996 | |
| EP | 0 725 004 | 8/1999 | |
| JP | 2-503783 | 11/1990 | |
| JP | 5-178262 | 7/1993 | |
| JP | 5-178264 | 7/1993 | |
| JP | H05178264 A * | 7/1993 | |
| JP | 5-330476 | 12/1993 | |
| JP | 7-81653 | 3/1995 | |
| JP | 7-149275 | 6/1995 | |
| JP | 7-251782 | 10/1995 | |
| JP | 8-216961 | 8/1996 | |
| JP | 9-109972 | 4/1997 | |
| JP | H09109972 A1 * | 4/1997 | B62K 25/04 |
| JP | 3198464 | 8/2001 | |
| JP | 2016-137792 | 8/2016 | |
| JP | 6122453 | 4/2017 | |
| KR | 10-1942232 | 1/2019 | |

OTHER PUBLICATIONS

Oku, JP H05178264 A, Machine Translation of Specification (Year: 1993).*

Mueller, DE 102012101551 A1, Machine Translation of Specification (Year: 2013).*

Naumovich, EP 0394438 A1, Machine Translation of Specification (Year: 1990).*

International Search Report issued Aug. 8, 2022 in International (PCT) Application No. PCT/AT2022/060130.

* cited by examiner

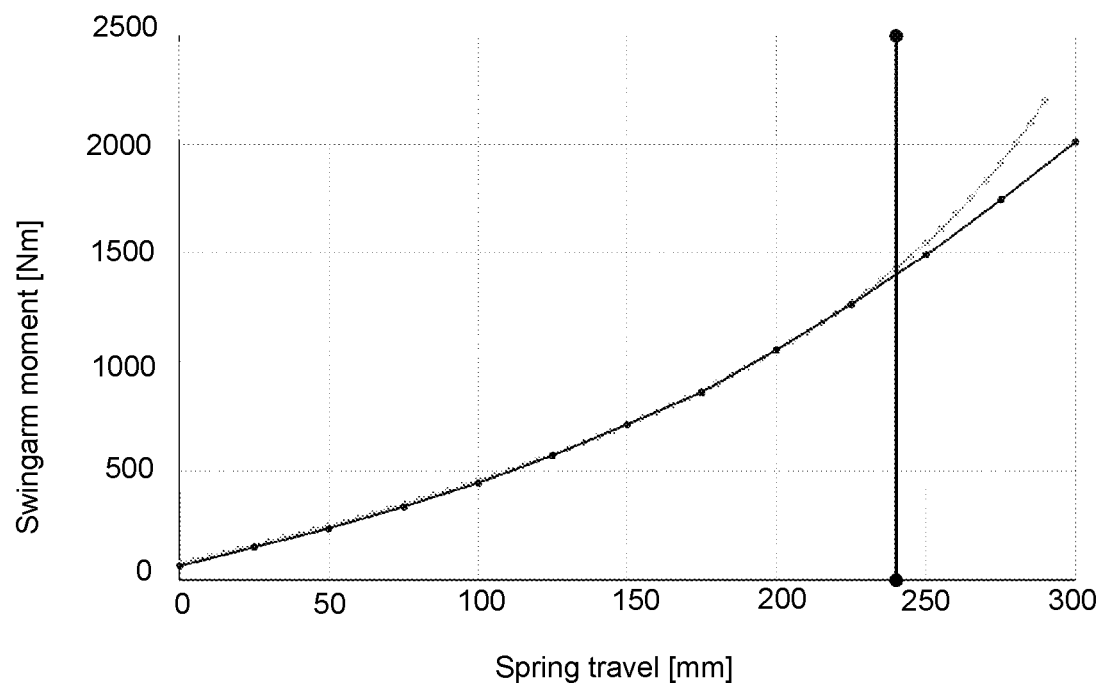

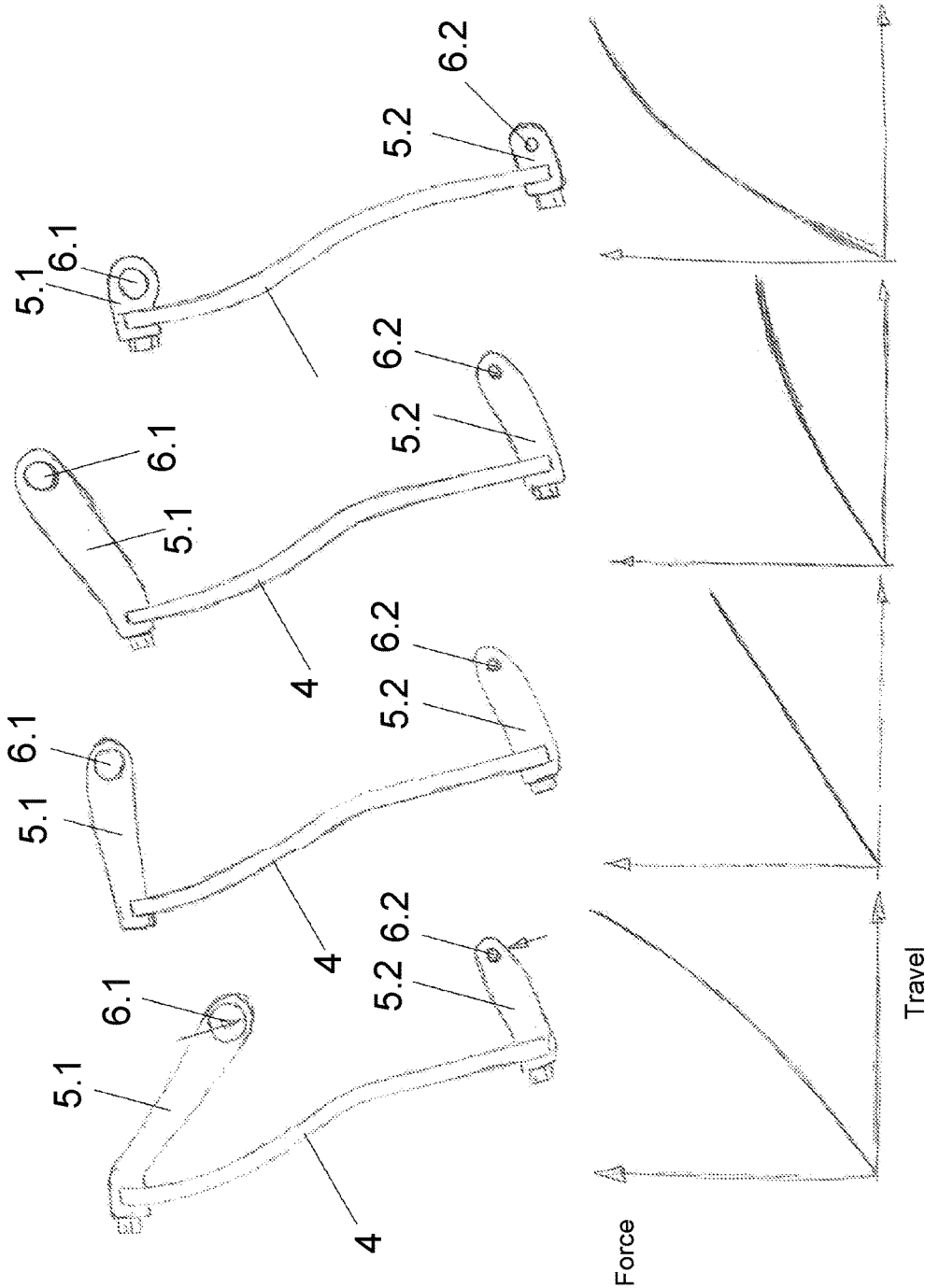

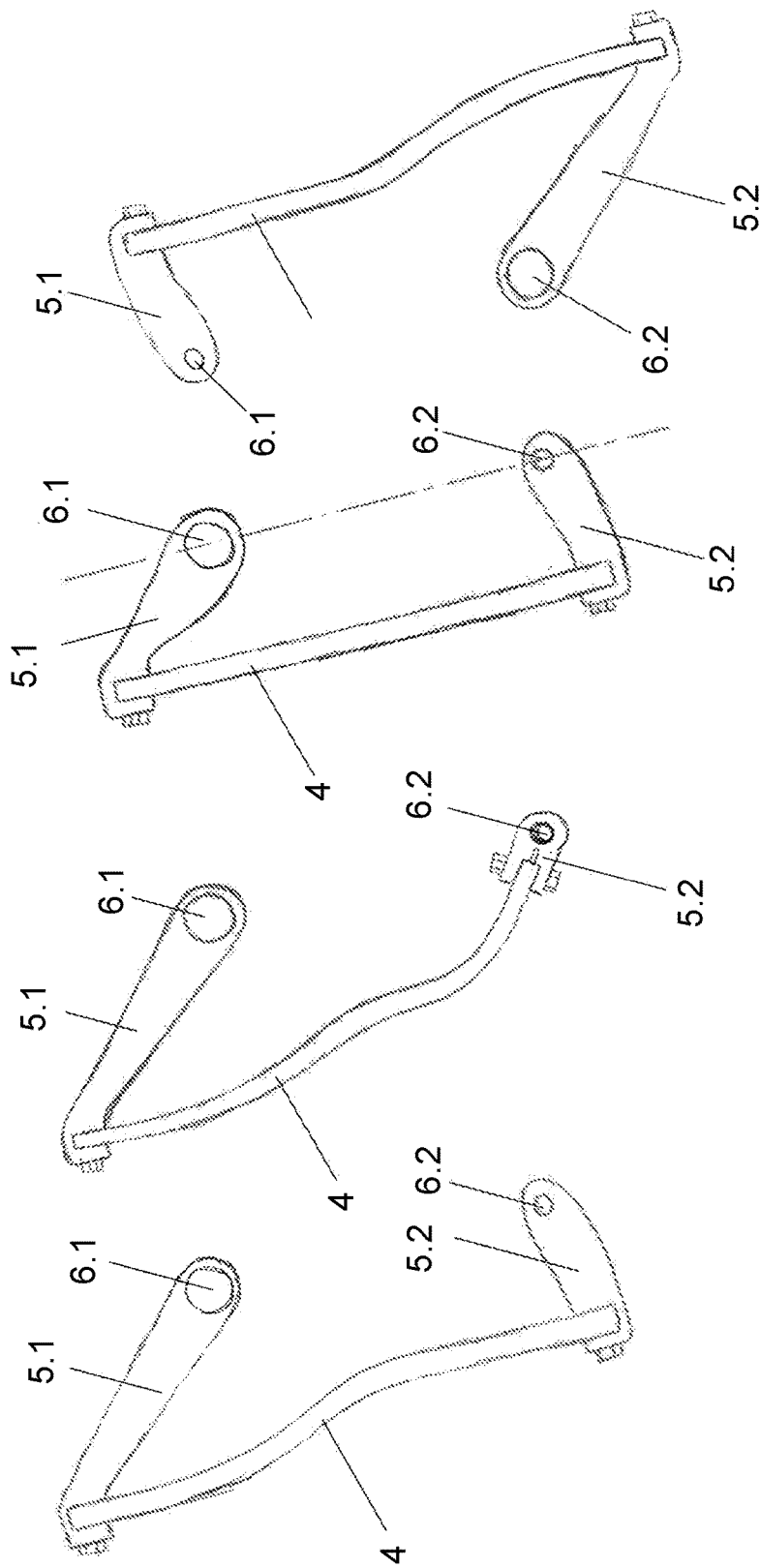

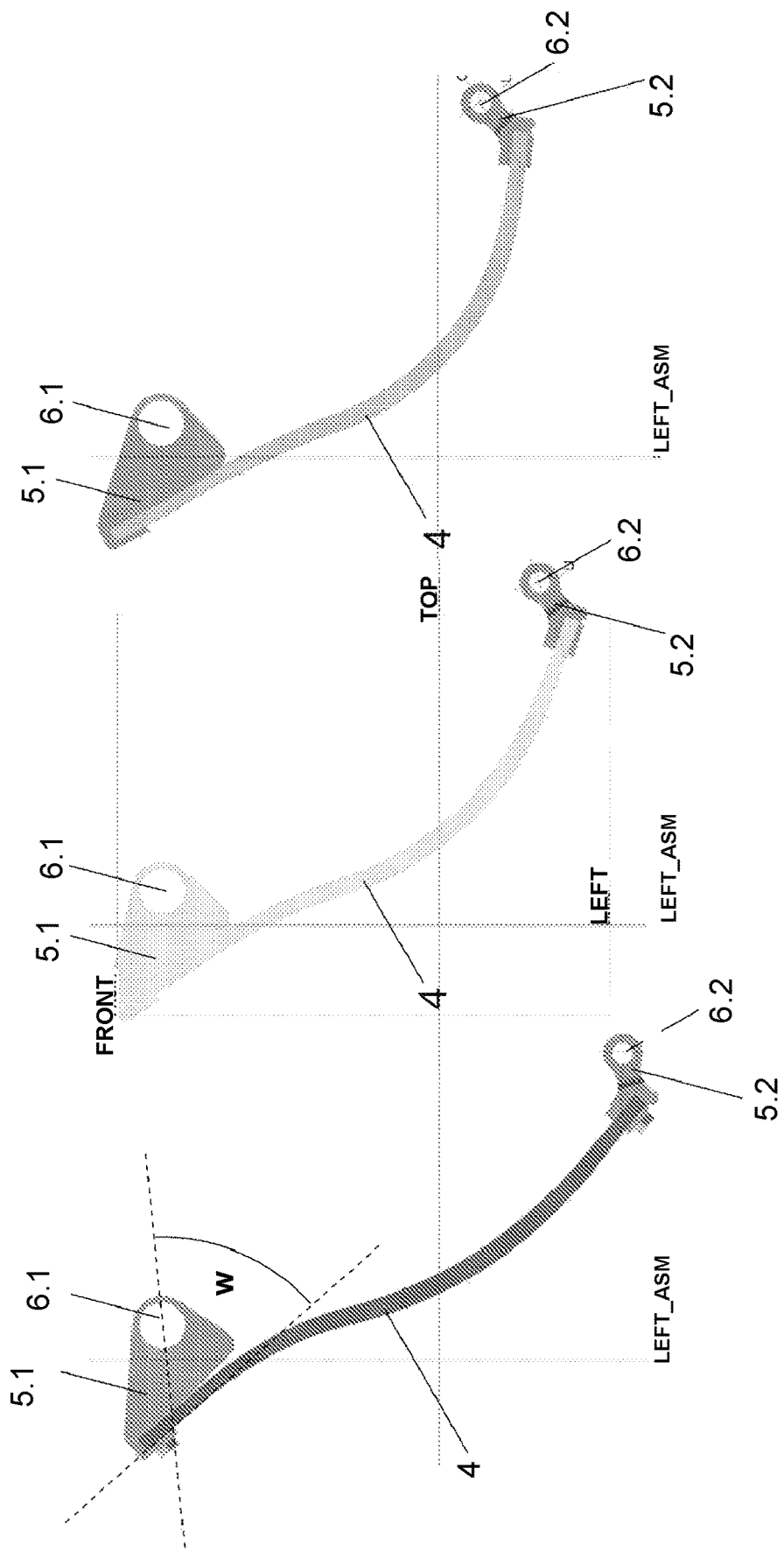

SINGLE-TRACK VEHICLE

BACKGROUND OF THE INVENTION

The present invention relates to a single-track vehicle, in particular a motorcycle.

Generic single-track vehicles contain a frame, a swingarm rotatable relative to the frame, and a leaf spring. The leaf spring is connected to the frame on the one hand and to the swingarm on the other hand to achieve a spring effect between the swingarm and the frame.

Leaf springs have long been known for the suspension in motorcycles. In fact, the leaf spring was probably originally more widespread than the coil spring that is prevalent today. Because larger spring travels could be achieved more easily with coil springs than with leaf springs, the coil spring has become established in the meantime. Nevertheless, it has also been attempted to implement leaf spring concepts in modern motorcycles. This was also a success in some cases. Machines using the leaf spring concept were in fact able to win races in the motocross world championship in the 90s.

Generic motorcycles are for example known from EP 0725004 B1, JP 6122453 B2, JP07149275 A, JP H05330476 A, JP H05178264 A or DE 102012101551 B4.

Although leaf springs should in principle have advantages over prevalent coil springs (for example in terms of the weight), leaf spring concepts could not become established in series production, for which the following reasons are to be mentioned.

- For the most part the leaf springs of the state of the art require a very large installation space, namely in awkward places on the motorcycle (poor "packaging"). This is usually due to the fact that the leaf spring is used as a 3-point bending beam, thus there must be at least three points of contact with the motorcycle spaced apart from one another.
- For similar reasons, weight reductions that are theoretically achievable using leaf springs compared with prevalent coil springs are not achieved, and in fact it is the other way round.
- The designs of the state of the art contain, in comparison with prevalent coil springs, many different component parts and are therefore comparatively complex.
- The leaf springs of the state of the art are often arranged such that they reduce the ground clearance of the motorcycle, which is particularly undesirable in the offroad sector.
- The known leaf springs are arranged in exposed places, for example underneath the engine or parallel to the swingarm, with the result that stone chippings, ground contact and the like lead to a short service life (delamination of the leaf spring).
- The already mentioned use as a 3-point bending beam in conjunction with a bearing body (see in particular EP 0725004 B1) has the result that foreign material can easily get between the bearing body and the leaf spring. This can also result in the delamination of the leaf spring and thus in a short service life.
- Limitations in the geometric arrangement of the leaf spring have the result that desired design aims, for example an improved progressivity of the spring force, cannot be achieved (or that for this additional component parts again have to be used, which adversely affect weight, complexity and installation space of the design).

SUMMARY OF THE INVENTION

The object of the invention is to provide a leaf spring concept for a single-track vehicle, which avoids the above-mentioned disadvantages at least to the extent that it can be used in a series-production vehicle.

This object is achieved by a single-track vehicle with the following features:
- connecting the leaf spring to the frame via a first lever and a first pivot bearing, with the result that a first pivot of the first pivot bearing is transversely offset relative to the leaf spring by virtue of the first lever, and/or
- connecting the leaf spring to the swingarm via a second lever and a second pivot bearing, with the result that a second pivot of the second pivot bearing is transversely offset relative to the leaf spring by virtue of the second lever.

A fundamental aspect of the invention is that, due to the spatial separation of the point at which the leaf spring is fastened to the frame or to the swingarm and the point at which the leaf spring actually takes effect (i.e. according to the invention at the leaf spring end of the first and/or second lever), at least one additional degree of freedom (rotation in conjunction with the spacing apart) is produced, which has effects on both the installation space and the kinematics of the suspension. In particular, pivot bearings transversely offset relative to the leaf spring allow the progression of the suspension—i.e. the increase in the spring force as a function of the deflection travel—to be specified in a targeted and precise manner over a wide range. This applies in particular, but not only, when a very strong progression is desired. Due to the additional degree of freedom that the invention provides during design of the suspension, namely, for example, linear or degressive suspensions can also be easily realized.

According to the invention, a clamping of a larger section of the leaf spring on the frame, as is taught in the state of the art (probably in order to achieve the desired progressivity of the spring force), can simply and easily be dispensed with.

According to the invention, the installation space for the leaf spring is thereby kept as small as possible. It is surprising that this makes it possible at the same time to design the spring kinematics, in particular the progressivity of the spring force, as desired (because the deformation of the leaf spring is no longer linked one to one to the relative movement between frame and swingarm).

Further advantages of the invention are that:
- the suspension can be designed with a small installation space (merely because only two connection points on the frame and on the swingarm are necessary) and can be arranged in desired places on the motorcycle, for example in protected places, wherein the ground clearance is not impaired,
- a lower weight can be achieved,
- simple designs can be realized, in particular few different parts have to be used, and
- durable designs can be realized, because no additional component parts, which contact the leaf spring for example for modifying the progression of the spring force, have to be used and because the leaf spring is loaded more evenly compared with the state of the art.

Compared with prevalent coil springs, leaf springs have an increased intrinsic damping, in particular in a fiber-reinforced plastic construction, which, as expected, results in an improvement in the riding properties of series-production motorcycles. Due to a geometric separation, in the invention the damping and the suspension can also be set largely independently of one another, in comparison with prevalent coil springs.

Within the meaning of the invention, plain and/or roller bearings are understood as first pivot bearing and/or second pivot bearing.

Embodiments of the invention, wherein the leaf spring can be mounted both offset relative to the (first) pivot on the frame and offset relative to the (second) pivot on the swingarm, can be particularly preferred. According to such embodiments, the leaf spring is then, in a sense, arranged floating on the motorcycle and provides the maximum potential for adapting the leaf spring to the installation space and the kinematics of the suspension.

Preferably, precisely one leaf spring can be used in order to reduce weight and installation space as far as possible. In principle, however, embodiments wherein two or more leaf springs are used according to the invention are also conceivable.

By the fact that the leaf spring is transversely offset relative to the first pivot and relative to the second pivot may be meant that the first and second pivots each have a distance from a plane (optionally imaginary and continued beyond the leaf spring) of the leaf spring.

The first pivot and the second pivot can in each case be an imaginary axis of rotation or a physical axle of the first pivot bearing or of the second pivot bearing.

The invention can particularly preferably be used in a rear suspension. The use in a front suspension is, however, at least theoretically conceivable.

The invention can be used in all types of motorcycles. By motorcycles is meant all single-track vehicles which have a drive motor for self-propulsion. The invention can particularly preferably be used in all-terrain motorcycles (enduro, motocross). In principle, the use of the invention in bicycles is also conceivable, wherein single-track vehicles with an auxiliary motor (i.e. not for self-propulsion but for assistance, such as for example in an e-bike) are also called bicycles.

Protection is also sought for the use of a leaf spring in a single-track vehicle according to the invention.

Preferably, the first pivot bearing can be arranged directly on the frame and/or the second pivot bearing can be arranged directly on the swingarm. In principle, the pivot bearings can, however, also be positioned differently. For example, the first pivot bearing could also be arranged and fastened on the engine or a battery box if this appears advantageous from a kinematic point of view. For the same reason, the first pivot bearing and/or the second pivot bearing can be arranged on extensions of any kind whatsoever, such as for example installed levers or the like, of the frame or the swingarm.

By the fact that the leaf spring is connected to the frame via a first lever and a first pivot bearing may therefore be meant that the pivot bearing is connected in a positionally fixed manner with respect to the frame of the single-track vehicle via a supporting structure of any kind whatsoever.

The leaf spring can preferably be in contact with the rest of the motorcycle exclusively via two connections, in particular the first lever and the second lever. As already mentioned, according to the invention leaf springs no longer have to be used as 3-point bending beams in order to realize desired spring kinematics, in particular with an acceptable or improved progression of the spring force.

Within the framework of the invention, however, it is in principle possible to provide further connection points. For example, in a similar manner to the state of the art a rolling body or bearing body could be used, for example in order to achieve an extremely strong progression of the spring force.

The first lever can enclose a right or acute angle with the leaf spring and/or the second lever can enclose a right or acute angle with the leaf spring.

Measured parallel to a line connecting the first pivot bearing and the second pivot bearing, the first lever and the second lever together (in this regard see FIGS. 3a and 3b) can have a length of between 1 cm and 20 cm, preferably between 2 cm and 15 cm and particularly preferably between 5 cm and 10 cm.

The first lever and/or the second lever can preferably have an extent parallel to the line connecting the first pivot bearing and the second pivot bearing, which is directed towards the respectively other lever, which can lead to a progressive spring behavior.

If a linear spring behavior is desired instead, the first lever and the second lever together can also have a length of approximately 0, measured parallel to a line connecting the first pivot bearing and the second pivot bearing.

For a more degressive spring behavior, the first lever and/or the second lever can also have an extent parallel to the line connecting the first pivot bearing and the second pivot bearing, which is directed away from the respectively other lever.

Measured perpendicular to the line connecting the first pivot bearing and the second pivot bearing, the first lever and the second lever together (in this regard see FIGS. 3a and 3b) can have a length of between 5 cm and 30 cm, preferably between 8 cm and 20 cm and particularly preferably between 10 cm and 18 cm.

The first lever and/or the second lever preferably has an adjustable length to allow for setting a spring preload and/or a spring stiffness of the leaf spring. This can for example be effected via a thread.

The leaf spring can be formed as a flat body with a first end and a second end, wherein the leaf spring is preferably arranged such that the first end and the second end of the leaf spring bend backwards with respect to the direction of travel when deflected.

The first end of the leaf spring can be clamped in a positionally fixed manner in the first lever and/or the second end of the leaf spring can be clamped in a positionally fixed manner in the second lever. An increased bending of the leaf spring can thereby be induced during the deflection process, which can support the progression of the spring force. The manner in which the leaf spring is fastened to the first lever and/or to the second lever is therefore a further possibility for influencing the spring characteristics.

The leaf spring can have a first curvature and/or a second curvature.

The first curvature and the second curvature can form an S shape, wherein the second curvature is preferably more pronounced than the first curvature (i.e., the second curvature has a smaller radius of curvature than the first curvature).

On the one hand, the spring force can be set as desired through the first curvature and/or the second curvature. On the other hand, the curvatures can be used such that the leaf spring is fitted into the motorcycle in as space-saving a manner as possible (optimized packaging).

It is to be pointed out that the mentioned S shape can only exist in the unloaded state and can be eliminated in a deflected state.

The first curvature can point backwards in the direction of travel with a concave side.

The second curvature can point forwards in the direction of travel with a concave side.

The first curvature can be arranged above the second curvature.

The leaf spring can particularly preferably be produced as a fiber-reinforced plastic, in particular glass fiber-reinforced plastic (GRP), wherein to produce the leaf spring a plurality of stacked fiber reinforcement plies of different lengths are flooded with the plastic or precursors of the plastic.

In this respect, the following features can be mentioned independently of one another.

The plastic can be a thermoplastic polymer and/or a synthetic resin.

By flooding of the fiber reinforcement plies is meant any contacting/introducing of the plastic or the precursor of the plastic (e.g. by means of autoclaves or molds), with the result that the fiber reinforcement plies are embedded in the plastic as a matrix, with the result that a plastic body is formed which has improved mechanical properties due to the fiber reinforcement plies.

The precursors of the plastic/synthetic resin can chemically react completely to form the plastic/synthetic resin and/or the thermoplastic can change into the solid (i.e. not plastic) phase by cooling.

The fiber reinforcement plies can preferably be so-called endless fiber reinforcement plies.

The fiber reinforcement plies can for example be present in the form of prefabricated tapes or organic sheets or can be draped directly.

The following areas can result with respect to the longitudinal axis of the leaf spring:
a first area of constant thickness of the leaf spring,
a second area of varying thickness of the leaf spring adjoining the first area, and
a third area of constant thickness of the leaf spring adjoining the second area.

It has already been mentioned that through the invention, a relatively homogeneous loading of the leaf spring can be achieved, with the result that the first area can extend over a relatively large area of the leaf spring.

Preferably, an area of constant thickness, in particular the first area and/or the second area, makes up more than 30%, preferably more than 40% and particularly preferably more than 50%, of the surface area of the leaf spring.

In the second area, the thickness of the leaf spring preferably changes such that the thickness decreases towards the first end of the leaf spring.

The third area can be used to clamp the leaf spring on the first lever in a positionally fixed manner.

It is to be noted that embodiments of the invention, wherein the leaf spring is manufactured from metal, in particular when the leaf spring is formed flat or almost flat (i.e. no first or second curvature) and/or is formed with a constant thickness, can also be preferred. In manufacturing terms, namely particularly simple embodiments of the invention can be realized in this way.

The preferred embodiments with respect to the leaf spring can of course also be used for the use according to the invention of the leaf spring.

The first pivot bearing and the second pivot bearing can be arranged substantially one above the other.

A connection of the leaf spring to the swingarm, in particular the second pivot bearing, can be arranged between a main pivot joint, which connects the swingarm to the frame, and a wheel axle, wherein the connection of the leaf spring to the swingarm is preferably arranged closer to the main pivot joint than to the wheel axle.

Relative to the swingarm length, i.e., the distance between the main pivot joint and the wheel axle, the connection of the leaf spring to the swingarm can be arranged less than 50% of the swingarm length, preferably less than 40% of the swingarm length, particularly preferably less than 36% of the swingarm length and quite particularly preferably less than 30% of the swingarm length, away from the main pivot joint.

In particularly preferred embodiments, the connection of the leaf spring to the swingarm can be arranged more than 20% of the swingarm length away from the main pivot joint, in particular can be arranged approximately 23% of the swingarm length away from the main pivot joint.

The connection of the leaf spring to the swingarm can have a distance of more than 10% of the swingarm length from the main pivot joint.

The wheel axle is, as mentioned, preferably the rear wheel axle.

BRIEF DESCRIPTION OF THE DRAWINGS

Further advantages and details of the invention are revealed by the figures and the associated description of the figures, in which:

FIG. 5 shows the spring force plotted against the spring travel for the embodiment according to FIG. 1, FIGS. 6a and 6b show simulation results of stress conditions in the leaf spring according to the embodiment according to FIG. 1, FIGS. 7a to 7d show further embodiments of leaf springs for a motorcycle according to the invention, FIGS. 8a to 8d show further embodiments of leaf springs for a motorcycle according to the invention, and FIGS. 9a to 9c show further embodiments of leaf springs for a motorcycle according to the invention.

DETAILED DESCRIPTION OF THE INVENTION

Figure 1:
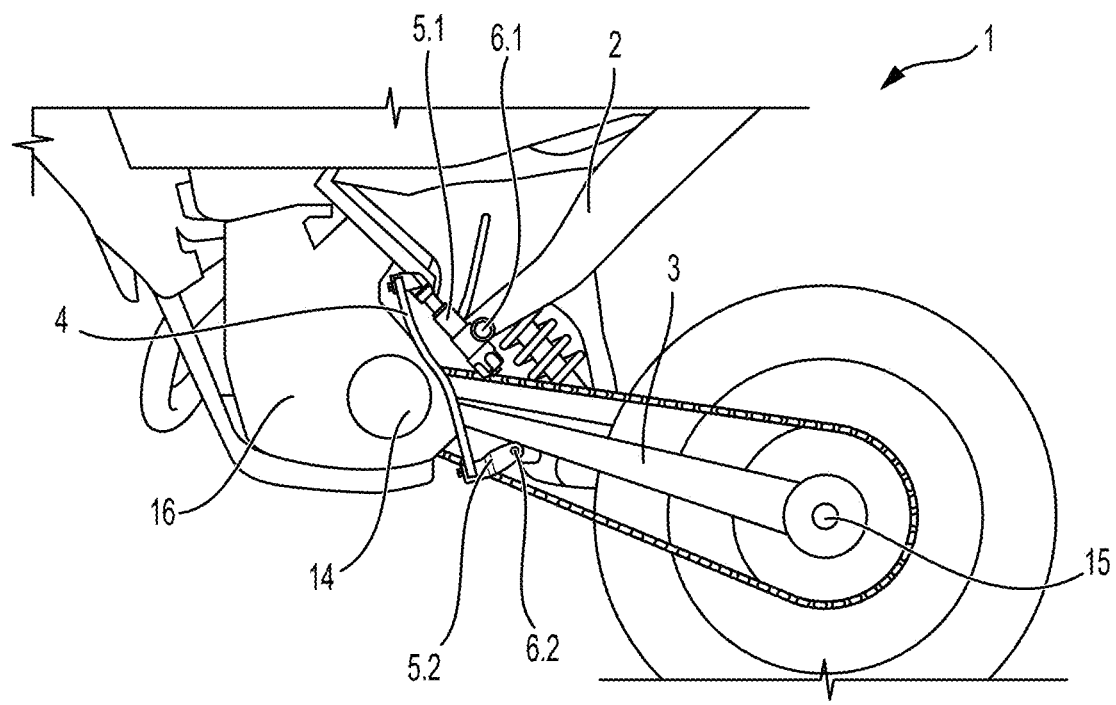
FIG. 1 shows an embodiment of a motorcycle according to the invention.

FIG. 1 shows a motorcycle 1 according to the invention (in this embodiment a motocross machine) with a frame 2 and a swingarm 3 which supports a wheel axle 15 (rear wheel axle). The swingarm 3 is connected to the frame 2 via the main pivot joint 14.

According to the invention, a leaf spring 4, which is mounted on the frame 2 via a first lever 5.1 and a first pivot bearing 6.1 and on the swingarm via a second lever 5.2 and a second pivot bearing 6.2, is provided as suspension.

It can immediately be recognized that the arrangement of the leaf spring 4 is a lot more space-saving compared with the state of the art and that the leaf spring 4 is arranged in a particularly well-protected place behind the engine 16. At the same time, the leaf spring 4 is very close to the engine 16 and takes up only minimal space.

It is to be mentioned that the leaf spring 4 replaces the coil spring that is likewise still recognizable in FIG. 1, the latter would therefore no longer be present in reality.

In the present embodiment, however, the damper element which can be designed as in principle in the state of the art would nevertheless still be present.

This comparison also reveals how little installation space the leaf spring 4 according to the invention requires. It is also to be pointed out that the space conditions in the area of the rear suspension in series-production motorcycles are particularly cramped, in particular if large spring travels are to be realized. The installation space obtained according to the invention can be utilized in various ways. For example, certain components of the engine 16 can be designed to be larger or more complex (e.g. intake section, exhaust pipe, airbox, front muffler) or more complex designs with more component parts can be taken into consideration. For example, the engine 16 could be replaced with an electric motor.

Due to the relatively small construction of the leaf spring 4, weight is also saved. Moreover, the leaf spring 4 is arranged quite low on the motorcycle 1, with the result that the center of gravity is advantageously shifted downwards, although the ground clearance is not impaired.

At the same time, the embodiment according to FIG. 1 is simple, i.e. not complex, requires only a few parts and is particularly durable.

In the embodiment according to FIG. 1, the first pivot bearing 6.1 and the second pivot bearing 6.2 are the only points of contact via which the spring arrangement (leaf spring 4 and levers 5.1 and 5.2) is in contact with the rest of the motorcycle 1 (although in principle a bearing body could also be used, e.g. approximately centrally with respect to the leaf spring 4 in FIG. 1, in order to achieve an even stronger progression in the case of the spring force).

For this reason and because the leaf spring 4, as mentioned, is arranged protected, the embodiment according to FIG. 1 is particularly durable.

Figure 2A:
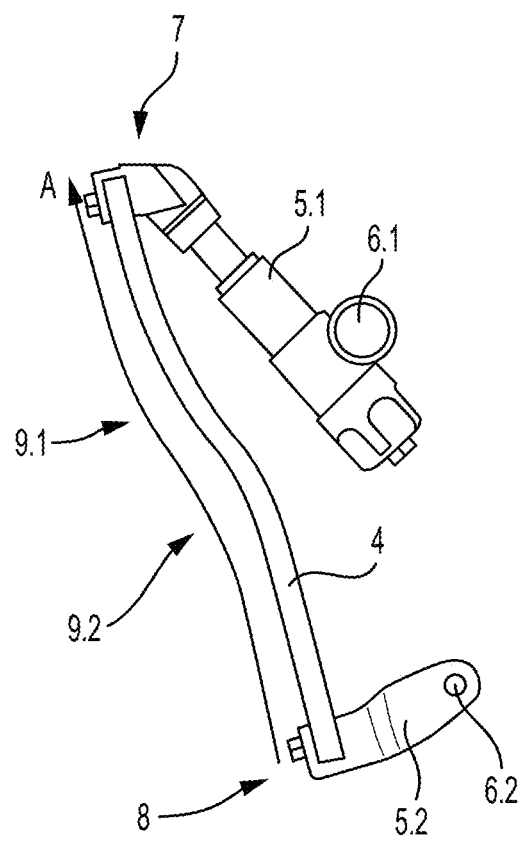
FIGS. 2a and 2b show the leaf spring from the embodiment according to FIG. 1 in a rebounded and a deflected state.
Figure 2B:
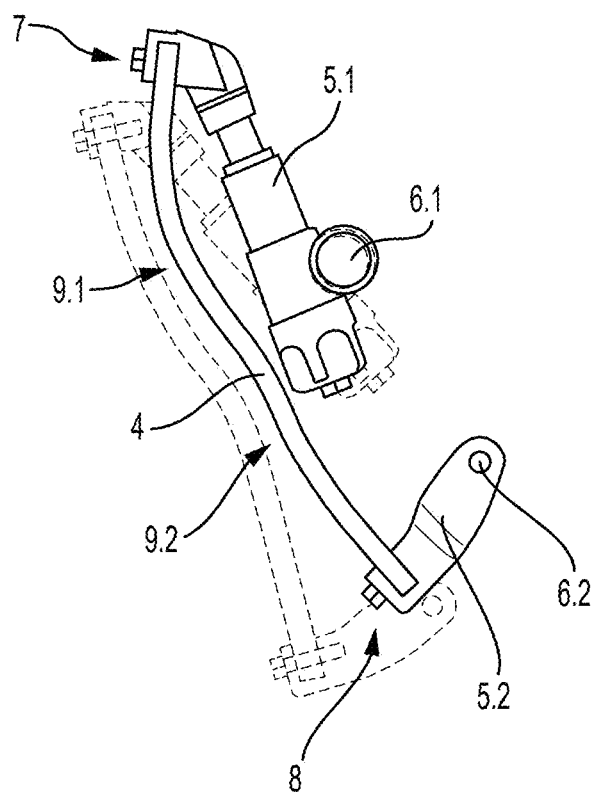

FIG. 2a and FIG. 2b show how the leaf spring 4 deforms when deflected, wherein the more highly loaded state is drawn in FIG. 2b.

Figure 4:
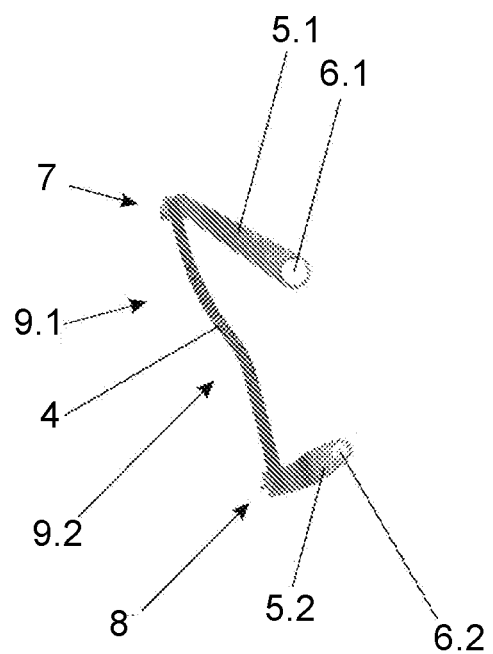
FIG. 4 shows a further embodiment of a leaf spring for a motorcycle according to the invention.

It can easily be recognized that, due to the rotating levers 5.1 and 5.2, a relatively even deformation and loading of the leaf spring 4 is achieved (in this regard see also FIGS. 5a and 5b), which at the same time has the result that the leaf spring 4 as a whole is utilized effectively, as a result of which a desired strong progression of the spring force can be achieved (in this regard see FIG. 4). It can be recognized that during the deflection, a relatively highly pronounced rotation of the levers, in particular of the first lever 5.1 (through 23°), occurs. This is also a prerequisite for the desired strong progression of the spring force.

In the present embodiment, the length of the first lever 5.1 can be set via a thread, in order to be able to set the spring preload of the leaf spring 4.

In the present embodiment, the first end 7 is clamped in the first lever 5.1 and the second end 8 is clamped in the second lever 5.2 in a positionally fixed manner (i.e. without allowing a rotation relative to the lever).

The leaf spring 4 has a first curvature 9.1 and a second curvature 9.2, which together produce an S shape of the leaf spring 4.

The second curvature 9.2 represents a reverse curvature, which gives the leaf spring 4 additional spring stiffness and at the same time saves installation space.

Figure 3A:
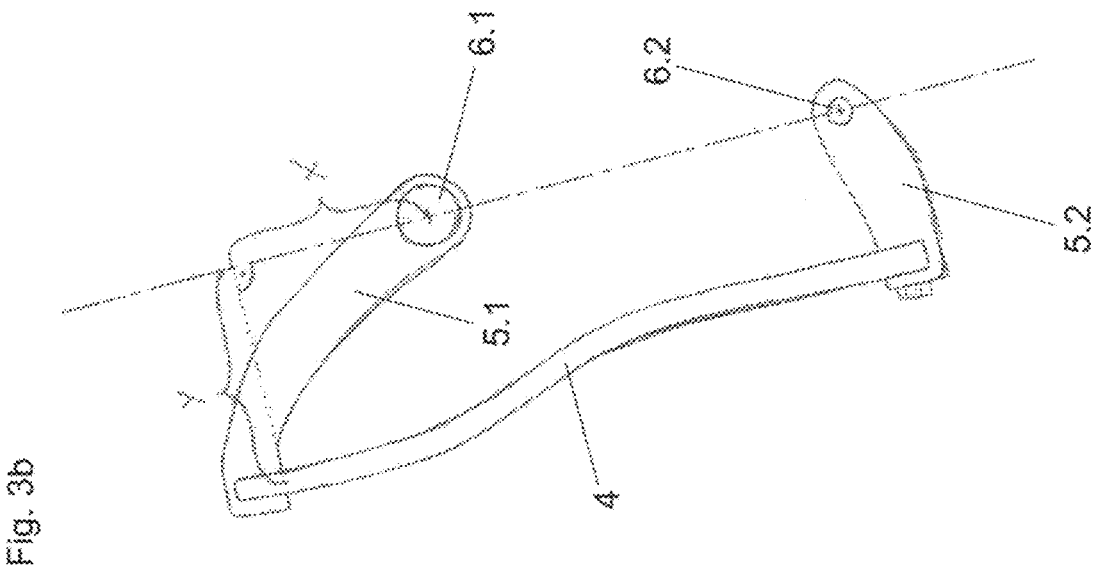
FIGS. 3a and 3b show the leaf spring from the embodiment according to FIG. 1 in a rebounded and a deflected state.
Figure 3B:
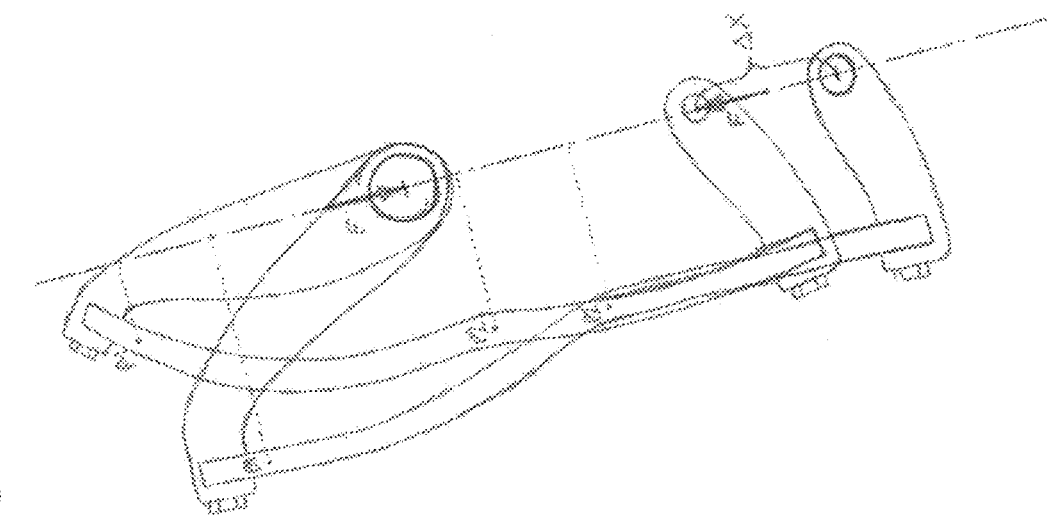

In FIGS. 3a and 3b, the leaf spring 4 is also represented in the rebounded and deflected states. In order to represent the functional principle of the invention even more precisely, for this the leaf spring 4 is represented in the reference system, which rotates with it, of the first pivot joint 6.1, with the result that the connecting line between the first pivot joint 6.1 and the second pivot joint 6.2 in the deflected state and that in the rebounded state coincide. In other words, the rotation of this connecting line illustrated in FIGS. 2a and 2b is not represented in FIG. 3a.

The first lever 5.1 can be characterized by two parameters X and Y, which measure the distance of the center point of the first pivot from the point at which the leaf spring 4 emerges from a clamp on the first lever 5.1 parallel or perpendicular to the line connecting the first and second pivots (see FIG. 3b).

In the present embodiment, X is approximately 8 cm.

In the present embodiment, Y is approximately 10 cm.

In FIG. 3a, the deflected and rebounded states of the leaf spring 4 are represented superimposed. The points P1 and P2 are also marked in the same places on the leaf spring 4, with the result that the movement and deformation of the leaf spring 4 between the two states can be easily understood.

As can be recognized from FIG. 3a, firstly a reduction in the distance ($\Delta X$) between the first and second pivots occurs under the effect of the force F. It can now be recognized that the point P2 has only shifted by a relatively small distance. In the case of the point P1, likewise only a relatively small change occurs in the X direction when deflected. The greatest change occurs in the case of the Y component of the point P1.

This intuitively shows why a first lever 5.1 with a larger X parameter results in a stronger progression of the spring force, because the larger the X parameter of the first lever 5.1 is, the greater the extent to which the point P1 shifts when deflected.

Of course, this would apply analogously to the second lever 5.2 in a similar consideration. Tests by the inventor show that the sum of the X values and the Y values of the two levers can be characteristic of the progressive, linear and/or degressive behavior.

The Y value for the second lever is approximately 7 cm in the present embodiment.

FIG. 4 shows an embodiment of the leaf spring 4, which is very similar to the embodiment according to FIG. 1. However, there is no variable-length first lever 5.1, with the result that the spring preload of the leaf spring 4 is fixed here.

In FIG. 5, the spring force of the leaf spring 4 from the embodiment according to FIG. 1 is plotted against the spring travel (darker ascending curve). A further line, which shows a progression of the spring force which is for example desired in the case of modern motocross motorcycles, can also be recognized in light gray. In this connection progression means that the spring force increases disproportionately in the spring travel when deflected, i.e. an "upward curve" can be recognized.

The vertical line in the graph from FIG. 5 shows the maximum spring travel of the motorcycle 1 according to the embodiment according to FIG. 1, which is for example realized via a rubber stop (also called a "bump rubber").

As can be seen, the actual curve matches the desired curve excellently up to the maximum spring travel and only exhibits larger deviations in the case of larger theoretical spring travels.

Smaller deviations towards the end of the maximum spring travel could for example be compensated for with a harder, enlarged or otherwise modified bump rubber.

Figure 6A:
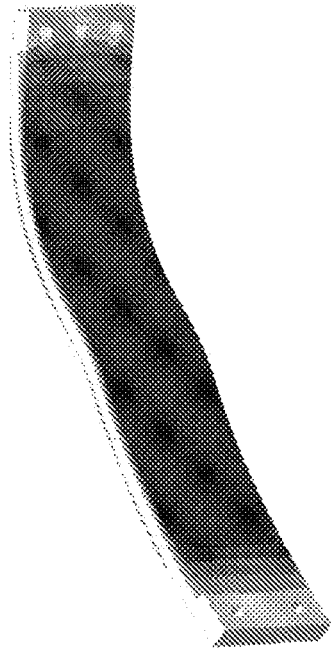
Figure 6B:
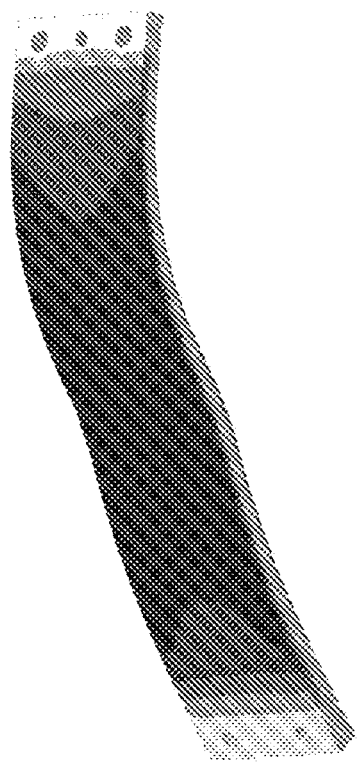

It has already been mentioned that the spring length according to the invention is considerably shorter than in the state of the art. This relates to the fact that, in the 3-point bending beam concepts, the maximum bending moment always occurs at the middle fastening. At the two outer fastening points, very little bending moment is generated and the leaf spring 4 is therefore loaded very unevenly over the spring length. This problem can be counteracted somewhat with the spring thickness and the ply structure, but nevertheless areas with high and low loading remain. According to the invention, the whole leaf spring 4 is loaded with a relatively consistent bending moment. Due to the even loading, the deformation that occurs can be distributed very homogeneously over the entire spring length. For illustration, the outer fiber strains in the completely deflected state are represented at the bottom in FIGS. 6a and 6b (FIG. 6a: inside, FIG. 6b: outside; inside points backwards in the direction of travel).

As already mentioned, however, the leaf spring 4 need not be produced in a GRP construction. In certain embodiments, for example, leaf springs 4 made of metal can also be used, particularly if no curvatures and/or leaf springs 4 with constant thickness are provided.

FIGS. 7a to 7d show various embodiments of leaf spring arrangements according to the invention with leaf springs 4, first levers 5.1 and second levers 5.2. Analogously to FIG. 4, for this a graph with the spring force over the spring travel is represented in each case. The leaf spring 4 is in each case formed identical in FIGS. 7a to 7d, i.e. FIGS. 7a to 7d differ only by the designs of the first lever 5.1 and the second lever 5.2.

FIGS. 8a to 8d show various embodiments of leaf spring arrangements according to the invention with leaf springs 4, first levers 5.1 and second levers 5.2.

It can be seen therefrom that the spring force over the spring travel crucially depends on the design of the first lever 5.1 and second lever 5.2. At the same time this shows that desired spring kinematics can be easily realized with the invention.

Further embodiments are represented in FIGS. 9a to 9c. As can be recognized from the second levers 5.2 in FIGS. 9a to 9c, the levers do not always have to be at an acute angle to the leaf spring. Levers which transversely displace the pivots relative to the leaf spring 4 (actually: relative to the imaginary continuation of the leaf spring 4) can also readily be used within the framework of the invention.

FIGS. 9a to 9c also show first levers 5.1, which are approximately triangular. It is to be noted that, in such embodiments, by angle w which the respective lever and the leaf spring 4 enclose is meant the one which is enclosed by the following two lines (see FIG. 9a):
line parallel to the longitudinal axis A of the leaf spring 4
line from the center point of the pivot to a point at which the leaf spring 4 emerges from a clamp on the first lever 5.1 (i.e. not quite up to the end of the leaf spring 4).

Further embodiments are conceivable. For example, the spring arrangement from FIG. 1 (or all other embodiments) could simply be installed reversed, i.e. the first lever 5.1 and the first pivot bearing 6.1 would swap places with the second lever 5.2 and the second pivot bearing 6.2 and the leaf spring would be installed mirrored horizontally (kinematic reversal). The first pivot bearing 6.1 could for example also be fastened directly to the engine 16.

Further statements relating to the advantages of the invention: The first advantage compared with known solutions (with acceptably progressive spring force) is the improved packaging. The spring can be more easily integrated in the vehicle layout and there is no loss of ground clearance. The prerequisite for this positioning in the vehicle is the comparatively short spring length.

The next advantage, the lower weight, results due to the smaller dimensions.

A further very important advantage is the issue of robustness, since, as has been proved, there were problems here in the known solution. The protection from the hard stone chippings from the front is effected through the concealed positioning of the spring (protected by the engine housing). The "normal" contamination by sand and smaller dirt particles is not a problem due to the omission of the rolling body, as no relative movement (between spring and clamp) occurs at the two clampings. In comparison, this is a real problem in the known solutions. If there is a little sand at the contact point (between spring and rolling body), then the grains of sand rub with each deflection and rebounding movement and quickly result in abrasive wear.

A further advantage with respect to a series-production application is the lower susceptibility to manufacturing tolerances on the frame. In practice, above all on the frame (caused by the welded design) a certain variation is to be expected. Due to the omission of the support and the rotatable mounting, however, the effects of the manufacturing tolerances on the resulting spring force are reduced.

For the sake of completeness, the issue of application of force or direction of application of force is also to be discussed. Experience shows that the flow of forces (how the occurring forces act on the rider from the edges via the interfaces such as footpegs, handlebars and seat) has an influence on the subjective riding experience. Through the altered application of force, an improvement in the riding experience is to be expected here.

The invention also provides an economic advantage, such that leaf spring concepts can actually be used in series-production machines. The invention has deliberately been kept very simple, that is to say overall fewer and simpler component parts are used. Assessed in a sweeping manner, fewer component parts result in lower component part costs and also less assembly effort, which in turn results in a more favorable product. Departing from the complete system and considering only the leaf spring 4 per se, an economic advantage then also results here. The leaf spring 4 according to the invention is made considerably smaller and thus less material is necessary as well.

In addition, importance can also be attached to a design that is suitable for production. According to the invention, the leaf spring 4 can have a very consistent wall thickness as a result of the relatively constant bending moment progression and can thus also contain many continuous fabric plies. In comparison, the leaf spring 4 in the known solutions has a considerably thicker cross section in the middle and that is achieved by the fact that additional short fabric plies also have to be inserted in the middle and the ply structure symbolically looks like a pyramid. Analogously to the conclusion in the case of the number of component parts, fewer plies here also mean less manufacturing effort and thus lower manufacturing costs of the leaf spring 4.

The invention claimed is:

1. A single-track vehicle comprising: a frame; a swingarm rotatable relative to the frame; and a leaf spring in contact with the vehicle at only two contact points by only two connections, a first connection of the two connections connecting the leaf spring to the frame, and a second connection of the two connections connecting the leaf spring to the swingarm to achieve a spring effect between the swingarm and the frame, wherein the leaf spring is connected to the frame via a first lever and a first pivot bearing such that a first pivot of the first pivot bearing is transversely offset relative to the leaf spring by the first lever, and/or wherein the leaf spring is connected to the swingarm via a second lever and a second pivot bearing such that a second pivot of the second pivot bearing is transversely offset relative to the leaf spring by the second lever.

2. The single-track vehicle according to claim 1, wherein the first pivot bearing is arranged directly on the frame, and/or the second pivot bearing is arranged directly on the swingarm.

3. The single-track vehicle according to claim 1, wherein the leaf spring is connected to the frame via the first lever, and is connected to the swingarm via the second lever.

4. The single-track vehicle according to claim 1, wherein the first lever forms a right or acute angle with the leaf spring, and/or the second lever forms a right or acute angle with the leaf spring.

5. The single-track vehicle according to claim 1, wherein the first lever and/or the second lever has an adjustable length to allow for setting a spring preload and/or a spring stiffness of the leaf spring.

6. The single-track vehicle according to claim 1, wherein the leaf spring has a flat body with a first end and a second end.

7. The single-track vehicle according to claim 6, wherein the first end of the leaf spring is clamped in the first lever in a positionally fixed manner, and/or the second end of the leaf spring is clamped in the second lever in a positionally fixed manner.

8. The single-track vehicle according to claim 1, wherein the leaf spring has a first curvature and/or a second curvature.

9. The single-track vehicle according to claim 8, wherein the first curvature and the second curvature form an S shape.

10. The single-track vehicle according to claim 1, wherein the leaf spring comprises a fiber-reinforced plastic including a plurality of stacked fiber reinforcement plies of different lengths flooded with a plastic material or precursors of the plastic material.

11. The single-track vehicle according to claim 1, wherein the leaf spring has along a longitudinal axis thereof:
a first area of constant thickness,
a second area of varying thickness adjoining the first area, and
a third area of constant thickness adjoining the second area.

12. The single-track vehicle according to claim 1, wherein the first pivot bearing and the second pivot bearing are arranged one above the other.

13. The single-track vehicle according to claim 1, wherein the second pivot bearing is arranged between a main pivot joint, connecting the swingarm to the frame, and a wheel axle.

14. A use of the single-track vehicle including the leaf spring according to claim 1.

15. The single-track vehicle according to claim 6, wherein the leaf spring is configured such that the first end and the second end of the leaf spring bend backwards with respect to the direction of travel when deflected.

16. The single-track vehicle according to claim 9, wherein a radius of curvature of the second curvature is smaller than a radius of curvature of the first curvature.

17. The single-track vehicle according to claim 13, wherein the second connection of the two connections connecting the leaf spring to the swingarm is closer to the main pivot joint than to the wheel axle.

* * * * *